United States Patent Office 2,882,297
Patented Apr. 14, 1959

2,882,297

PREPARATION OF ACRYLIC ACID ESTERS

Benjamin J. Luberoff, Stamford, Conn., assignor to American Cyanamid Company, New York, N.Y., a corporation of Maine No Drawing. Application March 26, 1956
Serial No. 573,605

2 Claims. (Cl. 260—486)

This invention relates to a novel and improved process for preparing acrylic acid and esters thereof. More particularly, it relates to the liquid phase reaction of acetylene, carbon monoxide and water or an alcohol, all in equivalent amounts, in the presence of a nickel halide salt catalyst. Still more particularly, it is concerned with such latter reactions in which acetylene is maintained in stoichiometric excess over the carbon monoxide and the simultaneous use of a catalyst comprising a mixture of nickel iodide and a supplemental but dissimilar soluble metal iodide.

In recent years, many investigators have studied the liquid phase reaction of acetylene, carbon monoxide and an active hydrogen compound, such as water and an alcohol, in the presence of a nickel salt at elevated temperatures and pressures. As a consequence of these investigations, various processes have been developed. However, none of these is entirely satisfactory. For instance, each suffers from a lack of speedy initial start-up. Usually, under the conditions of time, temperature and catalyst most favorable for reaction, fifteen minutes or more is required to initiate reaction. Thus, acetylene which remains unreacted in the reaction vessel under known reaction conditions is of ever growing concern because an otherwise serious explosion problem presents itself. Additionally, because the high pressure-liquid phase reaction as previously practiced requires long residence times before completion, homopolymerization of the acrylic acid derivative occurs with attendant loss in yield.

Since acrylic acid and esters thereof are valuable compounds of commerce, large expenditures of time, money and effort have been made to improve the known processes, but a wholly satisfactory solution to the problem has not been found.

It is, therefore, a principal object of the present invention to provide a new and novel process for preparing acrylic acid and its esters in good purity while effecting reaction within a relatively short time. It is a further object of the invention to provide a novel process which substantially reduces the probability of explosion hazards.

To this end, the above objects and others which will become apparent can be attained in a surprisingly straightforward manner. The disadvantages experieced in prior practices are largely mitigated by (1) combining the provision of an acetylene stoichiometric excess over carbon monoxide with (2) the provision of a nickel iodide catalyst mixture in which the ratio of the iodide ion to the nickel ion (I−/Ni++) is maintained greater than two but less than about five. In causing a mixture containing both the aforementioned catalyst and an excess of acetylene with respect to carbon monoxide, carbon monoxide and water or alcohol to react in the liquid phase, the reaction will be initiated quickly; also it will proceed smoothly and the possibility of experiencing an explosion is markedly reduced.

In accordance with the process of the present invention, two critical factors are observed. First, acetylene is provided in stoichiometric excess over the carbon monoxide. Second, a soluble nickel iodide catalyst mixture must be provided such that the ratio of iodide ion to nickel ion is greater than two but less than five. For example, the latter ratio is attained by either admixing equimolar quantities of nickel iodide ($NiI_2$) and a supplemental but dissimilar soluble metal iodide, such as sodium iodide (NaI) or zinc iodide ($ZnI_2$); or by providing a mixture of nickel chloride or nickel bromide with more than two equivalents of a metal iodide, for example, sodium iodide, lithium iodide, or zinc iodide. Alternatively, a catalyst mixture of nickel chloride and two or more equivalents of a dissimilar iodide can be used.

Although it is not entirely understood, it has been observed that the catalyst mixtures produce a synergistic effect in that the activity or life of such mixtures are materially increased over that of nickel iodide alone or the relatively inert dissimilar iodide. It is therefore a good practice to use about equimolar amounts of nickel iodide and the supplemental iodide.

As noted above, a wide variety of supplemental soluble metal iodides can be used herein. Such typically illustrative iodides which are soluble in an aqueous or organic medium or both includes: alkali metal iodides, such as sodium iodide, potassium iodide or lithium iodide; alkaline earth iodides, such as calcium iodide, barium iodide and strontium iodide; and other metal iodides, such as zinc iodide. As previously stated, any of a variety of combination of salts may be used herein with the proviso that the ratio of the iodide ion concentration to nickel ion concentration is greater than two but less than about five.

With respect to the quantity of acetylene which will be employed in the process of the invention, it is found that such quantity may vary over a wide range. Speaking generally, any amount of acetylene in excess of equivalent amounts of acetylene and carbon monoxide is within the purview and scope of this description. For most purposes, 1.1 to about 5 mols of acetylene per mol of carbon monoxide can be advantageously used. The acetylene quantity corresponds to from 10% to 400% excess over that of the carbon monoxide. Where larger quantities of acetylene have been used, increased beneficial results are not observed and the use of such excess is not a preferred practice. It is, however, preferred to employ of from 1.5 to 2.5 mols of acetylene per mol of carbon monoxide.

Where an ester of acrylic acid is desired, any alcohol and particularly a primary or secondary aliphatic monohydric or polyhydric alcohol may be employed, provided the alcohol is soluble in the reaction medium. Illustratively typical alcohols include: methyl alcohol, ethyl alcohol, n-butyl alcohol, sec-butyl alcohol, octyl alcohol, oleyl alcohol, lauryl alcohol, glycerol and pentaerythritol.

It is an advantage of the invention that the process can be carried out batchwise or in a semi-continuous manner, or even continuously and, if desired, in the presence of an inert solvent, such as glycol diethers. These include for example, ethylene glycol dimethyl ether, diethylene glycol dimethyl ether, ethylene glycol diethyl ether, diethylene glycol diethyl ether and the like.

Although temperatures and pressures may be varied widely in accordance with liquid phase catalyst reaction of the instant invention, it is preferred to conduct the aforedescribed process at temperatures ranging from about 150° C. to 250° C. and at pressures ranging at from 200 p.s.i. to 1000 p.s.i., and preferably from 300 p.s.i. to 700 p.s.i.

In order to facilitate a further understanding of the invention, the following examples will illustratively serve to demonstrate some of the more specific details of the invention. Unless otherwise stated, the parts given are by weight.

Example 1

An autoclave containing 2 parts of nickel chloride in the form of its hexahydrate and 3 parts of sodium iodide dissolved in 120 parts of n-butyl alcohol and 500 parts of diethylene glycol diethyl ether is charged with a gas mixture comprising 3 parts of acetylene and 1 part of carbon monoxide while maintaining a pressure of 495 p.s.i. at 200° C. Reaction commences substantially instantaneously. The pressure is permitted to fall to about 435 p.s.i. and there held for about forty minutes by introducing an equimolar feed of acetylene and carbon monoxide. The autoclave is permitted to cool and excess gases are vented. The reaction mass is filtered and the filtrate is distilled under vacuum. Butyl acrylate is recovered as distillate in good purity. The catalyst and solvent may be recycled after conventional treatment of the latter compound.

Example 2

The procedure of Example 1 is repeated in every material detail except that the nickel chloride is replaced by nickel iodide. Reaction is rapidly accomplished within twenty minutes.

Example 3

To a suitable autoclave are added 10 parts of water, 1 part of nickel chloride, 3 parts of lithium iodide and 150 parts of diethylene glycol diethyl ether. The reaction mass is heated to 230° C. A gas mixture comprising 5 parts of acetylene and 1 part of carbon monoxide is charged to the autoclave until a pressure of about 700 p.s.i. is obtained. Reaction commences almost instantaneously by observing a drop in pressure. It is substantially complete within forty-five minutes. The autoclave is cooled and the excess gases are vented. The reaction mass is then distilled under vacuum. Acrylic acid is recovered as distillate in good purity.

I claim:

1. In a process for preparing an ester of acrylic acid by reacting acetylene, carbon monoxide and an alcohol at a temperature of from about 150° C. to about 250° C. and under superatmospheric pressure in the range of from about 200 p.s.i. to about 1000 p.s.i. in the presence of a nickel iodide catalyst, the improvement therein for obtaining said ester which effecting said reaction in a shortened time which comprises: conducting said reaction in the presence of a catalyst mixture comprising nickel iodide and at least an equimolecular amount of an alkali metal iodide, and said reaction being conducted with at least a 10 mol percent excess of acetylene to carbon monoxide.

2. A process according to claim 1 in which the alkali metal iodide is sodium iodide.

References Cited in the file of this patent

UNITED STATES PATENTS

| | | |
|---|---|---|
| 2,582,911 | Neher et al. | Jan. 15, 1952 |

FOREIGN PATENTS

| | | |
|---|---|---|
| 854,948 | Germany | Nov. 11, 1952 |
| 872,205 | Germany | Mar. 30, 1953 |
| 1,093,117 | France | Nov. 17, 1954 |

OTHER REFERENCES

Carpenter: Fiat Final Report 933 (1946), pp. 3–5.

Copenhaver et al.: "Acetylene and Carbon Monoxide Chemistry" (1949), pp. 257–9; 262–5.